(12) United States Patent
Atmaram et al.

(10) Patent No.: US 9,371,065 B2
(45) Date of Patent: Jun. 21, 2016

(54) METHOD OF CONTROLLING A TRANSMISSION

(71) Applicant: GM GLOBAL TECHNOLOGY OPERATIONS LLC, Detroit, MI (US)

(72) Inventors: Harinath Atmaram, Novi, MI (US); Brian H Fiore, Waterford, MI (US); David Szpara, Milford, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 155 days.

(21) Appl. No.: 14/220,207

(22) Filed: Mar. 20, 2014

(65) Prior Publication Data

US 2015/0266463 A1  Sep. 24, 2015

(51) Int. Cl.
| | |
|---|---|
| *B60W 10/11* | (2012.01) |
| *B60W 10/113* | (2012.01) |
| *B60W 10/06* | (2006.01) |
| *F16H 61/04* | (2006.01) |
| *B60W 10/10* | (2012.01) |
| *F16H 61/684* | (2006.01) |
| *F16H 63/50* | (2006.01) |

(52) U.S. Cl.
CPC ............... *B60W 10/10* (2013.01); *B60W 10/06* (2013.01); *F16H 61/0437* (2013.01); *F16H 61/684* (2013.01); *F16H 63/502* (2013.01); *B60W 2510/1025* (2013.01); *B60W 2710/105* (2013.01); *F16H 2061/0444* (2013.01); *F16H 2306/24* (2013.01)

(58) Field of Classification Search
CPC .............. B60W 10/10; B60W 10/113; B60W 2510/1025; F16H 61/04; F16H 2061/0418; F16H 2306/14; F16H 2306/22
See application file for complete search history.

(56) References Cited

U.S. PATENT DOCUMENTS

| | | | | |
|---|---|---|---|---|
| 7,103,462 | B1* | 9/2006 | Suzuki | F16H 61/0437 701/51 |
| 7,374,512 | B2* | 5/2008 | Ayabe | F16H 61/061 477/133 |
| 7,651,439 | B2* | 1/2010 | Lee | F16H 61/0437 477/102 |
| 7,841,963 | B2* | 11/2010 | Doi | F16H 61/16 477/125 |

\* cited by examiner

*Primary Examiner* — Robert Hodge
*Assistant Examiner* — Tinh Dang
(74) *Attorney, Agent, or Firm* — Quinn Law Group, PLLC

(57) ABSTRACT

A method of controlling a transmission includes determining if the transmission is currently executing a first torque controlled shift from a first gear ratio to a second gear ratio. A torque controlled shift is defined as a shift control operation in which the speed of the engine is controlled to perform a shift operation. When a second torque controlled shift is detected while the transmission is currently executing the first torque controlled shift, a dual torque controlled shift strategy is executed, which merges a first shift control strategy for executing the first torque controlled shift with a second shift control strategy for executing the second torque controlled shift. The dual torque controlled shift strategy seamlessly executes the first torque controlled shift and the second torque controlled shift without a time delay and engine torque disruption therebetween.

13 Claims, 3 Drawing Sheets a # METHOD OF CONTROLLING A TRANSMISSION

TECHNICAL FIELD

The invention generally relates to a method of controlling an transmission.

BACKGROUND

Transmissions generally include a number of gear elements and torque establishing devices such as clutches and brakes. The clutches and brakes are selectively engageable to activate certain gear elements. Gear elements are activated to establish a desired speed or gear ratio between a transmission input shaft and a transmission output shaft.

The transmission input shaft may be connected to an engine through a fluid coupling such as a torque converter. The transmission output shaft is connected to vehicle wheels. Shifting from one gear ratio to another may be performed in response to changes in throttle position and vehicle speed. Alternatively, a driver may specifically command a shift between gear ratios.

A shift from one gear element to another may be an upshift (i.e., a shift to a higher gear) or a downshift (i.e., a shift to a lower gear). The shift may be further defined as a power-on shift (i.e., a shift that occurs when an accelerator pedal is depressed) or a power-off shift (i.e., a shift that occurs when an accelerator pedal is released).

Some shift operations may use positive torque management to complete the shift operation. Positive torque management is defined as the transmission sending a torque increase request to the engine, and the engine honors the request and increases torque production, in order to complete a shift operation.

SUMMARY

A method of controlling a transmission is provided. The method includes determining if the transmission is currently executing a first torque controlled shift from a first gear ratio to a second gear ratio. A torque controlled shift is defined as a shift control operation in which the speed of the engine is controlled to perform a shift operation. A request for a second torque controlled shift, from the second gear ratio to a third gear ratio, may be detected while the transmission is currently executing the first torque controlled shift from the first gear ratio to the second gear ratio. When the second torque controlled shift is detected while the transmission is currently executing the first torque controlled shift, a dual torque controlled shift strategy is executed, which merges a first shift control strategy for executing the first torque controlled shift with a second shift control strategy for executing the second torque controlled shift. The dual torque controlled shift strategy seamlessly executes the first torque controlled shift and the second torque controlled shift without a time delay and engine torque disruption therebetween.

A method of executing a dual torque controlled shift strategy, which merges a first shift control strategy for executing a first torque controlled shift with a second shift control strategy for executing a second torque controlled shift, is provided. A torque controlled shift is defined as a shift control operation in which the speed of the engine is controlled to perform a shift operation. The method includes releasing a first off-going clutch in accordance with the first shift control strategy, and gradually increasing a control pressure to a first on-coming clutch to gradually engage the first on-coming clutch in torque communication, in accordance with the first shift control strategy. An engine is commanded to provide a continuous, pre-defined torque value to the transmission, as the control pressure to the first on-coming clutch is gradually increased. A second on-coming clutch is staged in accordance with the second shift control strategy, such that a control pressure for the second on-coming clutch is increased to a staging pressure level to prepare the second on-coming clutch for engagement while providing no torque communication through the second on-coming clutch. A first off-going holding clutch is staged, such that a control pressure for the first off-going holding clutch is decreased to a minimum pressure level sufficient to prevent slip of the first off-going holding clutch. At a pre-determined time before a shift transition time, the first off-going holding clutch is released to prevent torque communication by the first off-going clutch. The shift transition time is defined as the time at which the dual torque controlled shift strategy transitions from the first shift control strategy for shifting from a first gear ratio to a second gear ratio, to the second shift control strategy for shifting from the second gear ratio to a third gear ratio. The control pressure to the second on-coming clutch is gradually increased, between the shift transition time and a shift completion time, from the staging pressure level, to gradually engage the second on-coming clutch in torque communication. The shift completion time is defined as the time at which the second torque controlled shift is completed. Torque communication capacity of the first on-coming clutch is continuously increased between a pre-determined time period before the shift transition time and a shift completion time, to transition the first on-coming clutch into a second holding clutch.

Accordingly, the dual torque controlled shift strategy merges the first shift control strategy for executing the first torque controlled shift and the second shift control strategy for executing the second torque controlled shift, to seamlessly transition from the first torque controlled shift to the second torque controlled shift. The dual torque controlled shift strategy executes both the first torque controlled shift and the second torque controlled shift, without a delay between the first torque controlled shift and the second torque controlled shift, providing a very responsive and smooth feel to the driver.

The above features and advantages and other features and advantages of the present invention are readily apparent from the following detailed description of the best modes for carrying out the invention when taken in connection with the accompanying drawings.

DETAILED DESCRIPTION

Those having ordinary skill in the art will recognize that terms such as "above," "below," "upward," "downward," "top," "bottom," etc., are used descriptively for the figures, and do not represent limitations on the scope of the invention, as defined by the appended claims. Furthermore, the invention may be described herein in terms of functional and/or logical block components and/or various processing steps. It should be realized that such block components may be comprised of any number of hardware, software, and/or firmware components configured to perform the specified functions.

In some transmissions, a user may specifically command or request a downshift, from a first, higher gear ratio to a second, lower gear ratio, or may request an upshift, from a first, lower gear ratio to a second, higher gear ratio. The user may command the downshift or the upshift by selecting a downshift or upshift button respectively, tapping a downshift or upshift paddle respectively, or by engaging some other user activated control device for requesting the downshift or the upshift. The driver may command the downshift or the upshift when an accelerator pedal is depressed, i.e., a user commanded, power-on down shift or power-on upshift. Alternatively, the driver may command the downshift when the accelerator pedal is not depressed, i.e., a user commanded, power-off down shift or power-off upshift. As noted above, a "torque controlled shift" is defined herein a shift control operation in which the speed of the engine is controlled to perform a shift operation. The speed of the engine may be controlled by the transmission requesting a specific torque output from the engine, e.g., positive torque management. Alternatively, the speed of the engine may be controlled by the transmission requesting a specific speed of the engine, e.g., engine speed management. An example of a torque controlled shift is a "quick shift", which is defined as a power-off, i.e., closed throttle, driver commanded downshift that uses engine torque management to complete a down shift between a first, higher gear ration and a second, lower gear ratio. Because a torque controlled shift may be user commanded, the user may command a second torque controlled shift while the transmission is still executing a first torque controlled shift.

Figure 1:
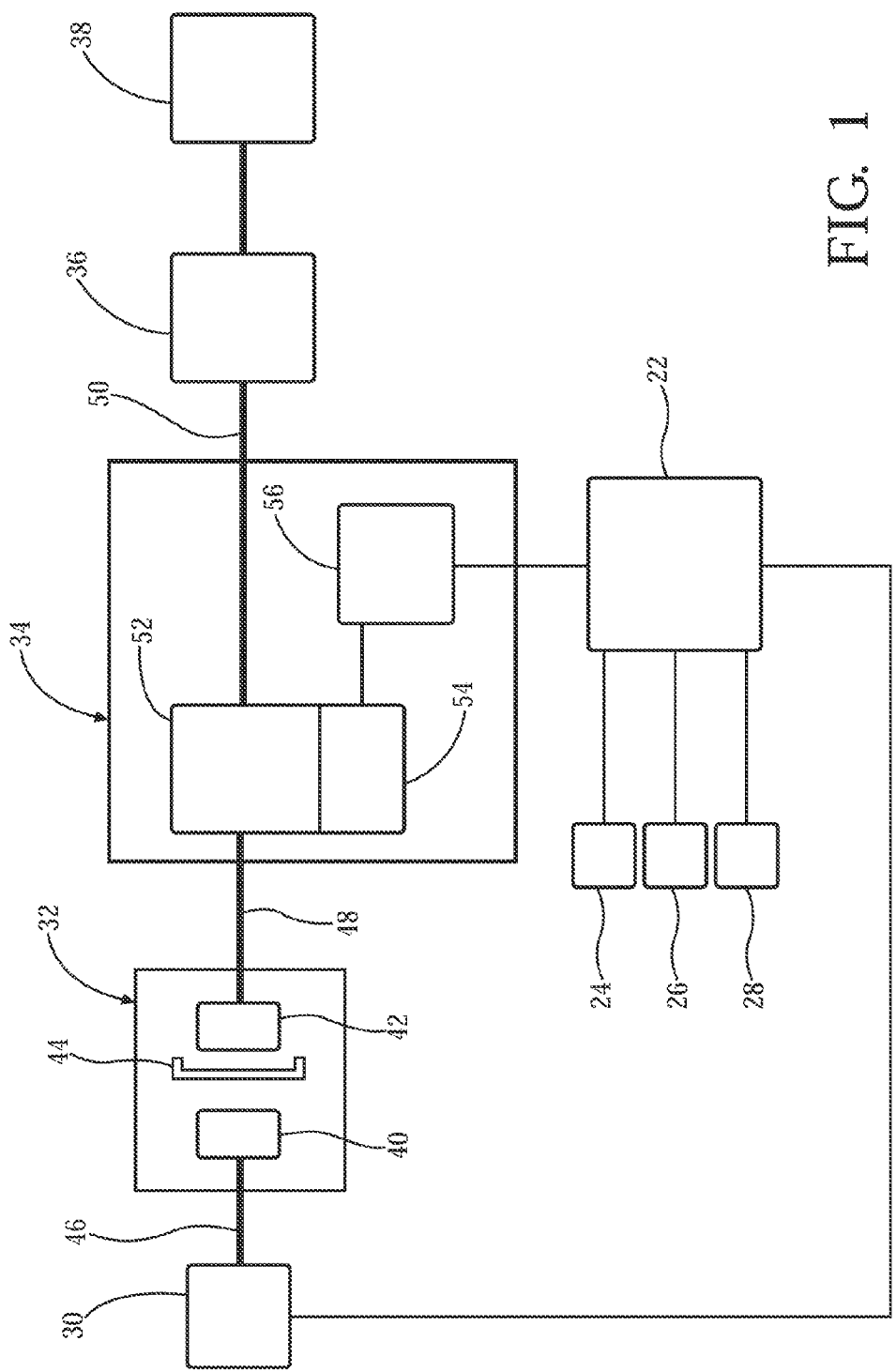
FIG. 1 is a schematic diagram of a powertrain for a vehicle.

Referring to FIG. 1, an exemplary vehicle system includes a powertrain 20 controlled by a control module 22. The control module 22 receives inputs from driver interface devices, such as a range selector 24, an accelerator pedal 26, and transmission shift controller 28s, as well as from sensors that sense operating conditions of the vehicle system. The powertrain 20 may include an engine 30, a torque converter 32, an transmission 34, a driveline 36, and one or more driven wheels 38. The engine 30 produces drive torque that is transmitted through the torque converter 32 to the transmission. The transmission transmits the drive torque to the driveline 36 at various gear ratios to drive the wheels.

The torque converter 32 includes a pump 40, a turbine 42, and a stator 44. The pump 40 is drivingly coupled to a crankshaft 46 of the engine 30. The turbine 42 is fluidly coupled with the pump 40, and drives rotation of the transmission. The stator 44 is disposed between the pump 40 and the turbine 42, and may be used to vary the torque transmitted through the torque converter 32.

The transmission includes an input shaft 48, an output shaft 50, a gear train 52, friction elements 54, and a hydraulic control system 56. The input shaft 48 drivingly couples the turbine 42 with the gear train 52. The output shaft 50 drivingly couples the gear train 52 and the driveline 36. The gear train 52 transmits torque from the input shaft 48 to the output shaft 50 at one or more gear ratios. The gear train 52 may be configured to provide any number of gear ratios. For example, the gear train 52 may be configured to provide 6, 7, 8, or more forward gear ratios, a reverse gear ratio, and a neutral mode.

The friction elements 54 are selectively engaged to provide the different forward gear ratios, the reverse gear ratio, and the neutral mode. The friction elements 54 may include a plurality of clutches and/or a plurality of brakes. Shifting from one gear ratio to another is achieved by disengaging one or more engaged friction elements 54, referred to as off-going clutches, while engaging one or more disengaged friction elements 54, referred to as on-coming clutches.

The hydraulic control system 56 controls various components of the transmission, including the gear train 52, as well as the operation of the friction elements 54. The hydraulic system includes a hydraulic pressure source and a hydraulic circuit. The hydraulic pressure source supplies hydraulic fluid at a first pressure to the hydraulic circuit. The first pressure supplied to the hydraulic circuit may be referred to as a line pressure. The hydraulic circuit selectively supplies the hydraulic fluid to the friction elements 54 at second pressures based on pressure commands received from the control module 22. The second pressures may be referred to as control pressures. Although not shown, the hydraulic circuit may include electromechanical actuators, such as solenoids, and hydraulic elements, such as poppet valves and check valves, for controlling the control pressures to the different friction elements 54. The hydraulic circuit controls the control pressures by selectively supplying fluid to or discharging fluid from apply chambers of the friction elements 54. The control module 22 controls the control pressures for both the off-going clutches and the on-coming clutches.

The control module 22, such as but not limited to a transmission control unit alone or in combination with an engine control unit, is operable to control the operation of the engine 30 and the transmission. The control module 22 may include a computer and/or processor, and include all software, hardware, memory, algorithms, connections, sensors, etc., necessary to manage and control the operation of the engine 30 and the transmission. As such, a method of controlling the transmission 34 may be embodied as a program operable on the control module 22. It should be appreciated that the control module 22 may include any device capable of analyzing data from various sensors, comparing data, making the necessary decisions required to control the operation of the engine 30 and transmission 34, and executing the required tasks necessary to control the operation of the engine 30 and the transmission 34.

Figure 2:
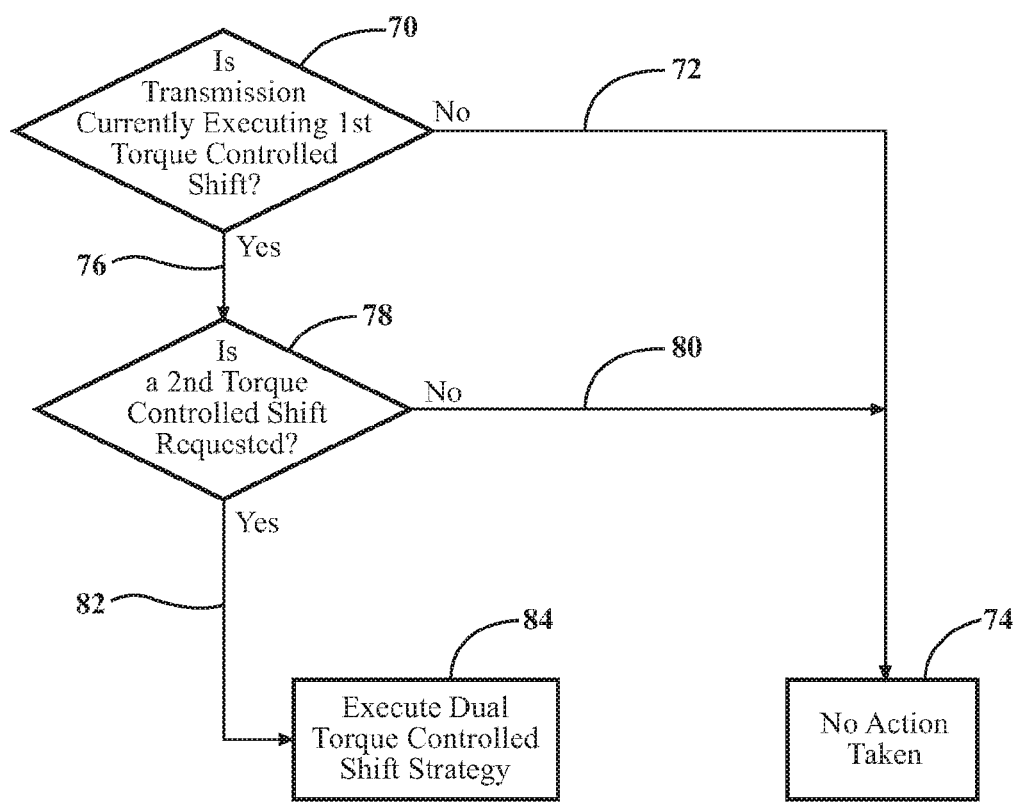
FIG. 2 is a flow diagram showing a method of controlling an transmission.

Referring to the Figures, wherein like numerals indicate like parts throughout the several views, a method of controlling a transmission 34 is generally shown in FIG. 2.

Referring to FIG. 2, the method includes determining, generally indicated by box 70, if the transmission 34 is currently executing a first torque controlled shift from a first gear ratio to a second gear ratio. As noted above, a "torque controlled shift" is defined as a shift control operation in which the speed of the engine is controlled to perform a shift operation. The speed of the engine may be controlled through positive torque management, in which the transmission requests a specific torque output from the engine. Alternatively, the speed of the engine may be controlled through engine speed management, in which the transmission requests a specific engine speed from the engine. The first gear ratio may be higher than the second gear ratio, or be lower than the second gear ratio. The first torque controlled shift may be between any consecutive gear ratios. The control module 22 of the vehicle may determine if the transmission 34 is currently executing the first torque controlled shift in any suitable manner, such as monitoring the operation of the transmission 34 through one or more sensors.

If the control module 22 determines that the transmission 34 is not currently executing a first torque controlled shift, generally indicated at 72, then no action is taken, generally indicated by box 74. However, if the control module 22 determines that the transmission 34 is currently executing a torque controlled shift, generally indicated at 76, then the control module 22 may then determine, generally indicated by box

78, if a second torque controlled shift is detected or requested. If the control module 22 determines that a second torque controlled shift was not requested, generally indicated at 80, i.e., if no command for a second torque controlled shift is commanded by the driver, then the control module 22 takes no further action, generally indicated by box 74. However, if the control module 22 does detect a request for a second torque controlled shift while the transmission 34 is currently executing the first torque controlled shift from the first gear ratio to the second gear ratio, generally indicated at 82, then the control module 22 executes a dual torque controlled shift strategy, generally indicated by box 84. The dual torque controlled shift strategy merges a first shift control strategy, for executing the first torque controlled shift, with a second shift control strategy, for executing the second torque controlled shift. The dual torque controlled shift strategy seamlessly executes the first torque controlled shift and the second torque controlled shift without a time delay and/or engine torque disruption therebetween.

Figure 3:
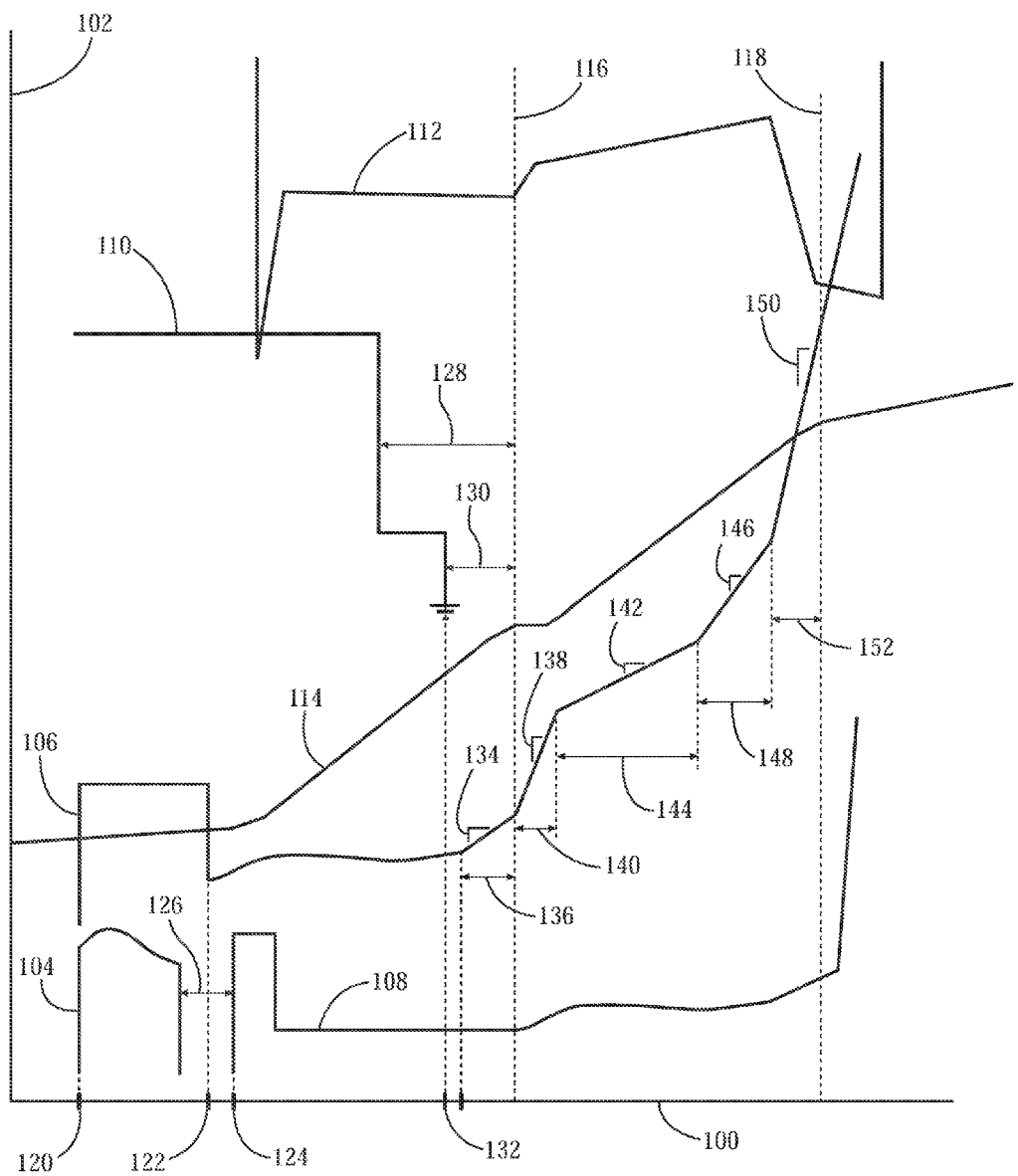
FIG. 3 is a graph showing a dual torque controlled shift strategy for executing a first torque controlled shift and a second torque controlled shift.

The dual torque controlled shift strategy is generally shown in FIG. 3. Referring to FIG. 3, clutch pressure control signals and sensor signals for the dual torque controlled shift strategy are shown. Within FIG. 3, time is generally represented by a horizontal x-axis 100, and change in magnitude of the various clutch pressure control signals and sensor signals are generally represented by a vertical y-axis 102. Clutch control signal 104 controls a first off-going clutch of the first torque controlled shift. Clutch control signal 106 controls a first on-coming clutch of the first torque controlled shift, which is transitioned into a second holding clutch for the second torque controlled shift. Clutch control signal 108 controls a second on-coming clutch of the second torque controlled shift. Clutch control signal 110 controls a first holding clutch for the first torque controlled shift. Sensor signal 112 indicates engine 30 torque provided to the transmission. Sensor signal 114 indicates a turbine 42 speed of the torque converter 32. Vertical reference line 116 represents a shift transition time, and vertical reference line 118 represents a shift completion time.

As used herein, the shift transition time is defined as the time at which the dual torque controlled shift strategy transitions from the first torque controlled shift control strategy for shifting from the first gear ratio to the second gear ratio, to the second torque controlled shift control strategy for shifting from the second gear ratio to the third gear ratio. Additionally, as used herein, the shift completion time is defined as the time at which the second torque controlled shift is completed.

The dual torque controlled shift strategy includes releasing the first off-going clutch in accordance with the first shift control strategy. Upon the control module 22 receiving the user command to execute the first torque controlled shift, at time 120, the control module 22 reduces the clutch control signal 104 to release the first off-going clutch so that no further torque is transmitted through the first off-going clutch. Additionally, upon the control module 22 receiving the user command to execute the first torque controlled shift, the control module 22 stages the first on-coming clutch in accordance with the first shift control strategy to shift from the first gear ratio to the second gear ratio. Staging the first on-coming clutch includes increasing the clutch control signal 106 for the first on-coming clutch, to a staging pressure level to prepare the first on-coming clutch for engagement, while providing no torque communication through the first on-coming clutch.

Once the first on-coming clutch is staged, and the first off-going clutch is released, the control module 22 gradually increases the control pressure to the first on-coming clutch. Accordingly, the clutch control signal 106 is increases at a time 122, which is after the clutch control signal 104 for the first off-going clutch has been released. The clutch control signal 106 is gradually increased over time, from the staging pressure level, to gradually engage the first on-coming clutch in torque communication. As shown in FIG. 3, the turbine 42 speed of the torque converter 32 increases as the first on-coming clutch begins to engage in torque communication.

Upon the control module 22 receiving the user command to execute the second torque controlled shift, at time 124, the control module 22 stages the second on-coming clutch in accordance with the second shift control strategy to shift from the second gear ratio to the third gear ratio. Staging the second on-coming clutch includes increasing the clutch control signal 108 for the second on-coming clutch, to a staging pressure level to prepare the second on-coming clutch for engagement, while providing no torque communication through the second on-coming clutch. If the first off-going clutch is also the second on-coming clutch, then the method further includes waiting a pre-determined period of time 126 after releasing the first off-going clutch, and before staging the second on-coming clutch.

Upon the control module 22 receiving the user command to execute the second torque controlled shift, at time 124, the control module 22 commands the engine 30 to provide a continuous, pre-defined torque value to the transmission 34, as shown by the sensor signal 112 of the engine 30 torque, prior to the shift transition time. The engine 30 is commanded to provide the torque level as the clutch control signal to the first on-coming clutch is gradually increased. The control module 22 commands the engine 30 to maintain the pre-defined torque value provided to the transmission 34 until the transition time 116.

Additionally, upon the control module 22 receiving the user command to execute the second torque controlled shift, and at a pre-determined period of time 128 prior to the shift transition time, the control module 22 stages the first off-going holding clutch. Staging the first off-going holding clutch includes decreasing the clutch control signal 110 to a minimum pressure level sufficient to prevent slip of the first off-going holding clutch.

Once the off-going holding clutch is staged in preparation for release, the control module 22 releases the first off-going holding clutch to prevent torque communication by the first off-going clutch. The control module 22 releases the first off-going holding clutch at a pre-determined time 130 before the shift transition time, at time 132.

After the control module 22 has released the first off-going holding clutch, at time 132, the control module 22 may then begin increasing the clutch control signal 106 applied to the first on-coming clutch. The clutch control signal 106 is increases at a predetermined a ramp-up rate 134, at a pre-determined time period 136 before the shift transition time. In so doing, the first on-coming clutch for executing the first torque controlled shift, is transitioned into the second on-coming holding clutch for the second torque controlled shift.

At the transition time 116, when the control module 22 transitions from executing the first shift control strategy for executing the first torque controlled shift, to the second shift control strategy for executing the second torque controlled shift, the control module 22 gradually increases the clutch control signal 108 to the second on-coming clutch. The clutch control signal 108 is increases from the staging pressure level, to gradually engage the second on-coming clutch in torque communication.

As the clutch control signal 108 for the second on-coming clutch gradually increase, the control module 22 also continues to increase the clutch control signal 106 for the second on-coming holding clutch, in order to increase the torque communication capacity of the second holding clutch. The control module 22 continues to increase the clutch control signal 106 for the second holding clutch, between the transition time and the shift completion time. The clutch control signal 106 for the second holding clutch may be increased at different rates for varying periods of time, between the shift transition time and the shift completion time. For example, as shown in FIG. 3, the clutch control signal 106 is increased at four different rates between the shift transition time and the shift completion time. The different rates include a first rate 138 for a first time period 140, a second rate 142 for a second period of time 144, a third rate 146 for a third period of time 148, and a fourth rate 150 for a fourth period of time 152. It should be appreciated that the number of rate increases and the time periods for each may vary from the exemplary embodiment shown in FIG. 3, and will depend upon the specific clutch and transmission operation.

At the transition time 116, when the control module 22 transitions from executing the first torque controlled shift to executing the second torque controlled shift, and as the control pressures to the second on-coming clutch and the second holding clutch are increased, the control module 22 commands the engine 30 to gradually increase the torque provided to the transmission 34. The constant application of torque from the engine 30 allows the second holding clutch to slip, as the second on-coming clutch increases torque transmitting capacity, so that the speed of the turbine 42 continues to increase.

By executing the dual torque controlled shift strategy, the control module 22 may execute both the first torque controlled shift and the second torque controlled shift seamlessly, without any felt interruption between shifts. As such, the transmission shifts from the first gear ratio, through the second gear ratio and into the third gear ratio, without any user perceived delay or torque interruptions therebetween.

The detailed description and the drawings or figures are supportive and descriptive of the invention, but the scope of the invention is defined solely by the claims. While some of the best modes and other embodiments for carrying out the claimed invention have been described in detail, various alternative designs and embodiments exist for practicing the invention defined in the appended claims.

The invention claimed is:

1. A method of controlling a transmission, the method comprising:
    determining if the transmission is currently executing a first torque controlled shift from a first gear ratio to a second gear ratio, wherein a torque controlled shift is defined as a shift control operation in which the speed of the engine is controlled to perform a shift operation;
    detecting a request for a second torque controlled shift from the second gear ratio to a third gear ratio, while the transmission is currently executing the first torque controlled shift from the first gear ratio to the second gear ratio;
    merging a first shift control strategy for executing the first torque controlled shift with a second shift control strategy for executing the second torque controlled shift to define a dual torque controlled shift strategy; and
    executing the dual torque controlled shift strategy to seamlessly execute the first torque controlled shift and the second torque controlled shift without a time delay and engine torque disruption therebetween, wherein executing the dual torque controlled shift strategy includes:
        releasing a first off-going clutch in accordance with the first shift control strategy;
        staging a first on-coming clutch in accordance with the first shift control strategy, such that a control pressure for the first on-coming clutch is increased to a staging pressure level to prepare the first on-coming clutch for engagement while providing no torque communication through the first on-coming clutch;
        gradually increasing the control pressure to the first on-coming clutch, from the staging pressure level, to gradually engage the first on-coming clutch in torque communication;
        commanding an engine to provide a continuous, pre-defined torque value to the transmission, as the control pressure to the first on-coming clutch is gradually increased; and
        staging a second on-coming clutch in accordance with the second shift control strategy, such that a control pressure for the second on-coming clutch is increased to a staging pressure level to prepare the second on-coming clutch for engagement while providing no torque communication through the second on-coming clutch.

2. The method set forth in claim 1 wherein the first off-going clutch is also the second on-coming clutch, and wherein the method further includes waiting a pre-determined period of time after releasing the first off-going clutch and before staging the second on-coming clutch.

3. The method set forth in claim 1 wherein executing the dual torque controlled shift strategy includes staging a first off-going holding clutch, such that a control pressure for the first off-going holding clutch is decreased to a minimum pressure level sufficient to prevent slip of the first off-going holding clutch.

4. The method set forth in claim 3 wherein executing the dual torque controlled shift strategy includes releasing the first off-going holding clutch to prevent torque communication by the first off-going clutch, at a pre-determined time before a shift transition time, wherein the shift transition time is defined as the time at which the dual torque controlled shift strategy transitions from the first shift control strategy for shifting from the first gear ratio to the second gear ratio, to the second shift control strategy for shifting from the second gear ratio to the third gear ratio.

5. The method set forth in claim 4 wherein executing the dual torque controlled shift strategy includes increasing the control pressure applied to the first on-coming clutch at a ramp-up rate at the pre-determined time period before the shift transition time, to transition the first on-coming clutch into a second holding clutch.

6. The method set forth in claim 5 wherein executing the dual torque controlled shift strategy includes gradually increasing the control pressure to the second on-coming clutch, from the staging pressure level, to gradually engage the second on-coming clutch in torque communication.

7. The method set forth in claim 6 wherein executing the dual torque controlled shift strategy includes continuously increasing torque communication capacity of the second holding clutch, between the transition time and a shift completion time, wherein the shift completion time is defined as the time at which the second torque controlled shift is completed.

8. The method set forth in claim 7 wherein executing the dual torque controlled shift strategy includes commanding the engine to maintain the pre-defined torque value provided to the transmission until the transition time.

9. The method set forth in claim 8 wherein executing the dual torque controlled shift strategy includes commanding the engine to gradually increase the torque provided to the transmission, at the transition time, as the control pressures to the second on-coming clutch and the second holding clutch are increased.

10. A method of executing a dual torque controlled shift strategy that merges a first shift control strategy for executing a first torque controlled shift with a second shift control strategy for executing a second torque controlled shift, wherein a torque controlled shift is defined as a shift control operation in which the speed of the engine is controlled to perform a shift operation, the method comprising:
  releasing a first off-going clutch in accordance with the first shift control strategy;
  gradually increasing a control pressure to a first on-coming clutch to gradually engage the first on-coming clutch in torque communication, in accordance with the first shift control strategy;
  commanding an engine to provide a continuous, pre-defined torque value to the transmission, as the control pressure to the first on-coming clutch is gradually increased;
  staging a second on-coming clutch in accordance with the second shift control strategy, such that a control pressure for the second on-coming clutch is increased to a staging pressure level to prepare the second on-coming clutch for engagement while providing no torque communication through the second on-coming clutch;
  staging a first off-going holding clutch, such that a control pressure for the first off-going holding clutch is decreased to a minimum pressure level sufficient to prevent slip of the first off-going holding clutch;
  releasing the first off-going holding clutch to prevent torque communication by the first off-going clutch, at a pre-determined time before a shift transition time, wherein the shift transition time is defined as the time at which the dual torque controlled shift strategy transitions from the first shift control strategy for shifting from a first gear ratio to a second gear ratio, to the second shift control strategy for shifting from the second gear ratio to a third gear ratio;
  gradually increasing the control pressure to the second on-coming clutch, between the shift transition time and a shift completion time, from the staging pressure level, to gradually engage the second on-coming clutch in torque communication, wherein the shift completion time is defined as the time at which the second torque controlled shift is completed; and
  continuously increasing torque communication capacity of the first on-coming clutch between a pre-determined time period before the shift transition time and a shift completion time, to transition the first on-coming clutch into a second holding clutch.

11. The method set forth in claim 10 wherein the first off-going clutch is also the second on-coming clutch, and wherein the method further includes waiting a pre-determined period of time after releasing the first off-going clutch and before staging the second on-coming clutch.

12. The method set forth in claim 10 further commanding the engine to maintain the pre-defined torque value provided to the transmission until the transition time.

13. The method set forth in claim 12 further comprising commanding the engine to gradually increase the torque provided to the transmission, at the transition time, as the control pressures to the second on-coming clutch and the second holding clutch are increased.

\* \* \* \* \*